Sept. 25, 1956
C. W. HOWARD
2,764,190
AUXILIARY SAW FENCE
Filed Sept. 13, 1954
2 Sheets-Sheet 1
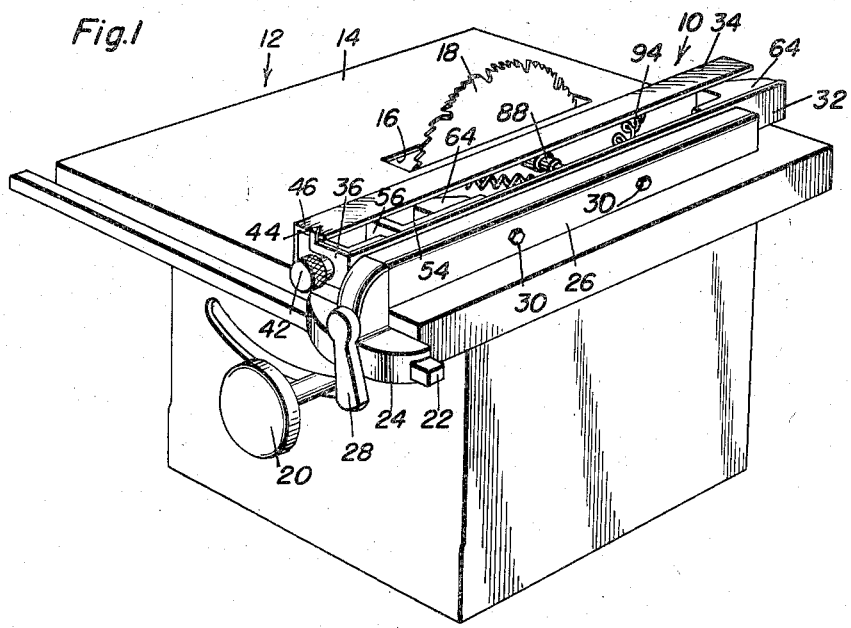
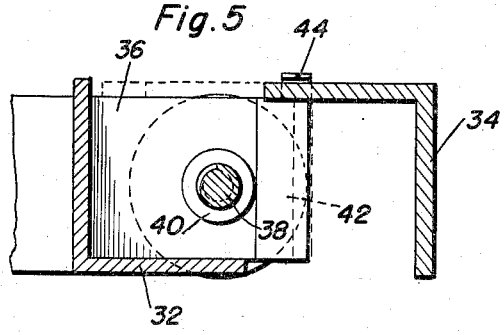
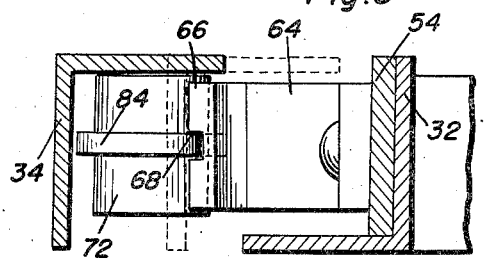
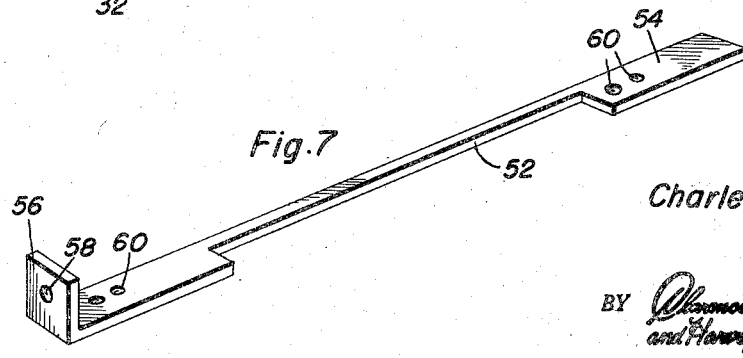
Charles W. Howard
INVENTOR.
BY *Thomas A. O'Brien*
and *Harry B. Jacobs*
Attorneys Sept. 25, 1956
C. W. HOWARD
2,764,190
AUXILIARY SAW FENCE
Filed Sept. 13, 1954
2 Sheets-Sheet 2
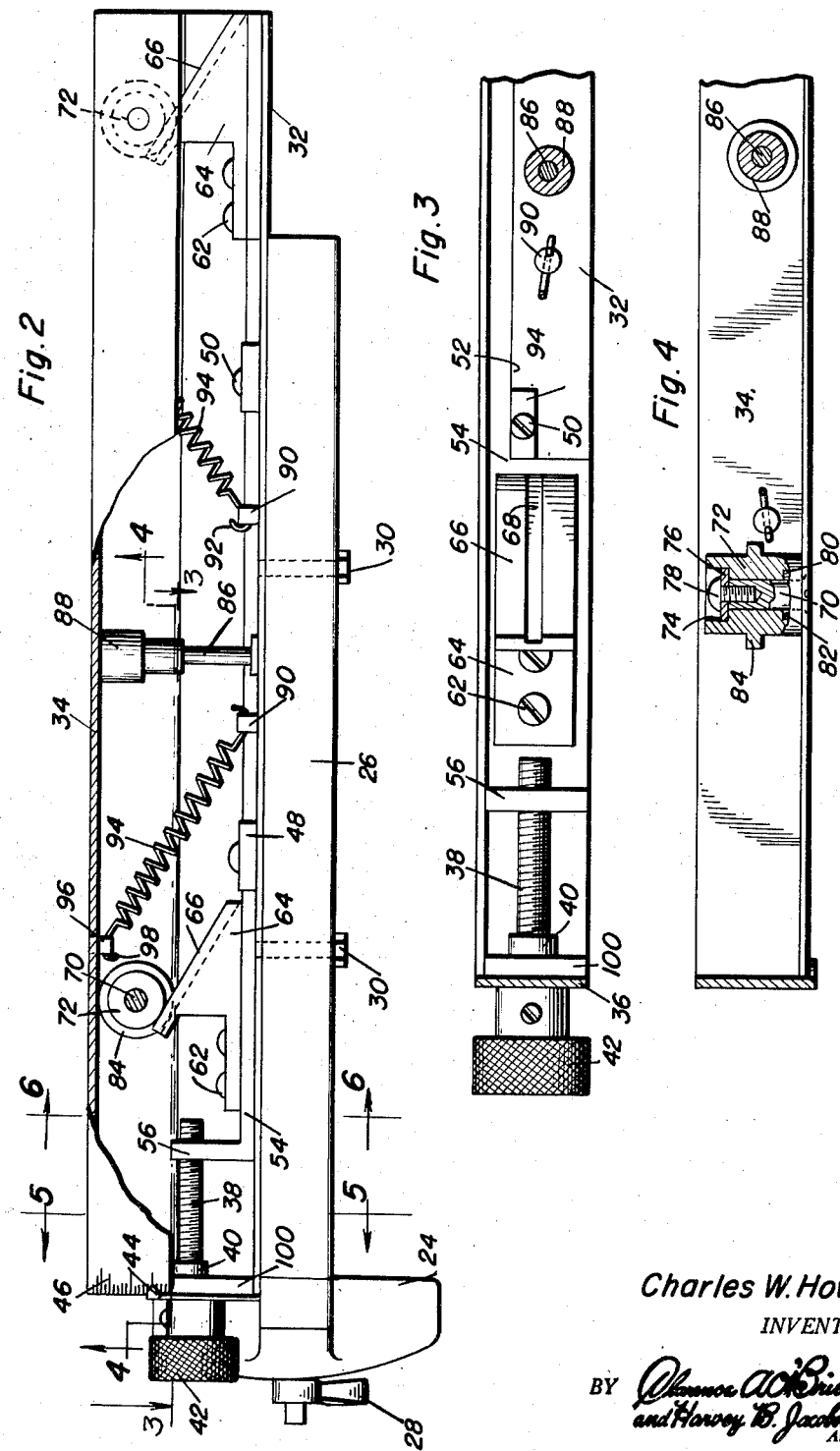
Charles W. Howard
INVENTOR.

United States Patent Office 2,764,190
Patented Sept. 25, 1956

2,764,190

AUXILIARY SAW FENCE

Charles W. Howard, Franklin, Ohio

Application September 13, 1954, Serial No. 455,665

2 Claims. (Cl. 143—174)

This invention relates to an auxiliary saw fence and more specifically provides a device for attachment to a power saw table for accurately gauging the distance from the saw blade to a conventional fence saw or the like.

An object of this invention is to provide an auxiliary saw fence for use in conjunction with a conventional bench-type saw having a longitudinal saw fence wherein the present invention permits accurate and small adjustment for adjusting the width of material to be cut as it passes the rotating saw blade.

A further object of the present invention is to provide an auxiliary saw fence having novel construction wherein the saw fence extends parallel to the side surface of the saw blade and the relative distance therebetween may be adjusted by rotating an adjustment knob.

A still further important feature of the present invention is to provide an auxiliary saw fence having novel construction for adjusting the saw fence in relation to the saw blade wherein the auxiliary saw fence of the present invention enhances the adjustable features of the conventional bench type table saw.

Yet another important object of the present invention is to provide an auxiliary saw fence that is simple in construction, efficient in operation, easy to attach to existing saws, well adapted for its purposes and relatively inexpensive to manufacture and maintain.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view showing the auxiliary saw fence of the present invention in use on a bench saw having the usual saw fence thereon wherein the auxiliary saw fence of the present invention is secured thereto;

Figure 2 is a top plan view of the saw fence of the present invention with portions thereof broken away showing the details of construction of the camming element for moving one portion of the auxiliary saw fence in relation to the other portion and moving one portion of the saw fence in relation to the saw;

Figure 3 is a detailed, longitudinal sectional view taken substantially upon a plane passing along section line 3—3 of Figure 2 showing the details of construction of the cam member and the operating knob therefore.

Figure 4 is a longitudinal, vertical sectional view taken substantially upon a plane passing along section line 4—4 of Figure 2 showing the structural details of the cam-following roller and the peripheral rib thereon for engaging the grooved cam;

Figure 5 (Sheet 1) is a transverse, vertical sectional view taken substantially upon a plane passing along section line 5—5 of Figure 2 showing the structural details of the interior of the auxiliary saw fence of the present assembly;

Figure 6 is a transverse, vertical sectional view taken substantially upon a plane passing along section line 6—6 of Figure 2 showing further structural details of the auxiliary saw fence; and Figure 7 is a perspective view showing the cam supporting member that slides in relation to the auxiliary saw fence in accordance with the rotational movement of the operating knob.

Referring now specifically to the drawings, it will be seen that the numeral 10 generally designates the auxiliary saw fence of the present invention for attachment to a conventional bench-type saw generally indicated by the numeral 12 having a table surface 14 thereon with a slot 16 having a saw blade 18 rotatable therein wherein the vertical height of the saw blade 18 in relation to the table top 14 may be adjusted and the angular relationship of the table top 14 and the saw 18 may be adjusted by a control knob 20. The table top 14 normally is provided with a transverse polygonal bar 22 along one edge thereof for receiving a slide member 24 on a conventional saw fence 26 wherein a clamp member 28 is provided for clamping the saw fence 26 in adjusted relation on the table top 14 wherein the saw fence 26 may be adjusted relative to the side face of the saw 18, thereby determining the width of material being cut by the saw 18 as the material passes by the saw 18 when it rests against the conventional saw fence 26.

The auxiliary saw fence 10 of the present invention is secured to the conventional saw fence 26 by fastening bolts 30 wherein the auxiliary saw fence 10 of the present invention provides an accurate and minute adjustment of the distance from the saw blade 18 thereby quickly and easily adjusting the width of the material being cut by the saw 18.

Referring now specifically to Figures 2–6, it will be seen that the auxiliary saw fence 10 includes two right angular members 32 and 34 that are disposed in opposite relation to each other and have right angularly disposed legs that are equal in length wherein the right angular members 32 and 34 will form substantially a longitudinally elongated hollow box when the right angle members 32 and 34 are moved adjacent each other.

It will be noted that the right angular member 32 is positioned against the longitudinal edge of the conventional saw fence 26 and is rigidly secured thereto by detachable fastening bolts 30 that are in screw-threaded engagement therewith. The end of the right angular member 32 adjacent the conventional saw fence guide 24 is provided with a perpendicularly extending closure member 36 that rotatably supports a threaded rod 38 extending therethrough. A collar 40 is positioned on the threaded rod 38 for engagement of the inner surface of the projection 36 and a knurled knob 42 is positioned on the outer free end of the threaded shaft 38 for rotation of the shaft 38 for a purpose described hereinafter. Projecting upwardly from the upper surface of the projection 36 is a pointed lug 44 that overlies and registers on indicia 46 on the upper surface of the right angular member 34 wherein the distance between the vertical legs of the right angular member 32 and the right angular member 34 may be easily observed thereby determining the relative distance between the saw blade 18 and the outer surface of the vertical leg of the right angular member 34 thereby determining the width of the material being cut by the saw 18 as the material passes by the saw 18 in engagement with the surface of the vertical leg of the right angle member 34.

Positioned in spaced relation to the inner surface of the right angle member 32 adjacent one edge thereof is a pair of lugs 48 secured thereto by fastening members 50. The lugs 48 engage a longitudinally elongated recessed portion 52 in a slide bar 54 positioned against the inner surface of the vertical leg of the right angular member 32. One end of the slide bar 54 is provided with an upstanding projection 56 that extends laterally therefrom in perpendicular relation and is provided with an internally threaded aperture 58 for threaded engagement with the threaded shaft 38 wherein rotation of the knob 42 and the threaded shaft 38 will cause a sliding movement of the slide bar 54. It will be seen that the enlarged ends of the slide bar 54 are each provided with a pair of internally threaded apertures 60 for receiving fastening members 62 for securing cam members 64 adjacent each end of the slide bar 54. The cam members 64 each include an inclined cam surface 66 having a longitudinal groove 68 therein. The inclined surfaces 66 of the cam members 64 are inclined in the same direction and the groove 68 of one of the cam members is in longitudinal alignment with the groove 68 in the other of the cam members 64. It will be seen that by rotation of the knob 42, the slide bar 54 together with the cam members 64 will move longitudinally in relation to the right angular member 32 and in relation to the conventional saw fence 26 thereby moving the inclined surfaces 66 of the cam members 64 for a purpose described hereinafter.

The right angular member 34 is provided with a pair of projecting studs 70 in longitudinally spaced relation on the horizontal leg thereof for rotatably supporting rollers 72. Each roller 72 is provided with a recessed outer end 74 for receiving a washer 76 and a screw threaded fastening member 78 that is attached to a threaded socket in the stud 70 for securing the roller 72 on the stud 70 in rotating relation. The inner end of the roller 72 is provided with a recess 80 for receiving a washer 82 thereby permitting easy rotation of the roller 72 on the stud 70. The periphery of each of the rollers 72 is provided with a centrally positioned peripheral rib 84 wherein the ribs 84 are in longitudinal alignment and are in alignment with the grooves 68 in the cammed surfaces 66 of the cam members 64 and the portions of the rollers 72 on each side of the peripheral rib 84 will engage the inclined surfaces 66 of the cam members 64 on each side of the grooves 68. It will be seen that the rollers 72 are spaced apart a distance equal to the cam members 64 thereby urging the right angular member 34 away from the right angular member 32 when the inclined surfaces are moved toward the rollers 72 and permitting the movement of the right angular member 34 toward the right angular member 32 when the cam surfaces 66 are moved away from the rollers 72.

Positioned centrally on the vertical wall of the right angular member 32 is a projecting stud 86 and projecting centrally of the vertical wall of the right angular member 34 is a projecting socket 88 that telescopically receives the stud 86 wherein the sliding movement of the right angular member 34 in relation to the right angular member 32 will be guided. Positioned on each side of the central member 86 is an upstanding stud 90 having a transverse aperture in the upper end for receiving the hook end 92 of a tension coil spring 94 which is attached at its other end to a projecting stud 96 on the vertical leg of the right angular member 34 by the other hook end 98 of the spring 94. It will be seen that the upstanding stud 90 on the right angular member 32 serves to anchor the tension springs 94 that extend between the right angular member 32 and the right angular member 34 in diverging relation and also resiliently retain the rollers 72 against the inclined cam surfaces 66. It is noted that the sliding movement of the right angular members 32 and 34 are guided by the telescoping stud and socket 86 and 88 and also a guiding shelf 100 is provided at the closed end having the projection 36 thereon of the right angular member 32 thereby providing support for the horizontal leg of the right angular member 34 during its sliding movement.

In practical operation, the auxiliary saw fence end 10 is secured to the inner surface of the conventional saw fence 26 with the fastening bolts 30. By manipulation of the control knob 42, the slide bar 54 along with the cam members 64 are moved longitudinally of the right angle member 32 thereby engaging the rollers 72 and moving the right angular member 34 transversely in relation to the saw 18 thereby accurately and minutely adjusting the distance therebetween. The transverse sliding movement of the right angular member 34 is guided by the telescoping stud and socket 86 and 88 as well as the shelf 100 and the thickness of the cam members 64. The tension coil springs 94 disposed in diverging relation continuously urge the right angular member 34 toward the right angular member 32 and away from the saw blade 18 thereby resiliently retaining the rollers 72 against the inclined surfaces 66 of the cam 64 wherein the peripheral ribs 84 ride in the grooves 68. The ribs 84 are in alignment as are the grooves 68 thereby retaining the right angular members 32 and 34 in longitudinal alignment during transverse relative movements therebetween. The lugs 48 mounted in the recessed portion 52 of the slide bar 54 guide the sliding movement of the slide bar 54 and also limit the sliding movement of the slide bar 54 thereby limiting the sliding movement of the cam member 64 thereby assuring that the rollers 72 will be continuously engaged with the inclined surfaces 66 of the cam member 64. The cooperation between the indicia 46 on the upper end of the surface of the right angular member 34 and the indicating pointed lug 44 will enable the operator of the saw 18 to accurately and quickly determine the position of the right angular member 34 and change this position as desired. It will be seen that the auxiliary saw fence of the present invention permits a quick, easy and accurate adjustment of the saw fence for determining the width of material to be cut by the saw without the necessity of unloosening the clamp member 28 on the conventional saw fence 26 and the resultant inaccurate adjustment due to the necessity of awkwardly forcing the saw fence 26 along the slide bars 22 at each end of the table 14.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. An auxiliary saw fence comprising a pair of longitudinally elongated members disposed in spaced parallel relation to the saw, means disposed between said members for moving said members in transverse horizontal relation, one of said members being fixed in relation to the saw wherein the movement of the other member will vary the distance between the saw and the other member, said means including an exteriorly positioned operating knob, and cam means urging said members apart, said cam means being actuated by said operating knob, said cam means including an inclined surface mounted on a sliding bar, and a roller mounted on said other member in engagement with said surface, said bar being moved by said operating knob, said inclined surface having a longitudinal groove and said roller having a peripheral rib in engagement therewith for aligning said members.

2. In combination with a saw having a table top with a slot therein, a saw extending upwardly through said slot, a saw fence adjustably mounted in spaced parallel relation to the saw, an auxiliary saw fence disposed between the saw fence and the saw, said auxiliary saw fence comprising a pair of elongated members disposed in parallel relation, one of said members being attached to the saw fence and the other of said members facing the saw, means interconnecting said members moving and guiding the other of said members in relation to the one of said members, said interconnecting means including a bar slidably mounted on the one of said members, inclined cam surfaces mounted on said bar, each of said cam surfaces having a longitudinal groove therein, an operating knob journaled on said one of the members and threadedly connected to said bar for longitudinal movement thereof, the other of said members having a pair of rollers mounted thereon for engagement with the cam surfaces, each of said rollers having a centrally disposed peripheral rib thereon for engagement with said grooves, tension springs extending between said members for urging the members together, the longitudinal movement of the bar and cam surfaces causing lateral movement of the other of said members in parallel relation to the saw.

References Cited in the file of this patent

UNITED STATES PATENTS

| | | |
|---|---|---|
| 100,695 | Walker | Mar. 8, 1870 |
| 105,023 | Wood | July 5, 1870 |
| 221,805 | Gordon | Nov. 18, 1879 |
| 287,124 | Hamlet | Oct. 23, 1883 |
| 501,521 | Marsh | July 18, 1893 |
| 1,535,596 | French | Apr. 28, 1925 |
| 1,686,246 | Murner | Oct. 2, 1928 |

FOREIGN PATENTS

| | | |
|---|---|---|
| 1,051 | Sweden | Dec. 1, 1887 |
| 618,192 | France | Dec. 10, 1926 |